US006089450A

United States Patent [19]

Koeple

[11] Patent Number: 6,089,450
[45] Date of Patent: *Jul. 18, 2000

[54] RECEIPT PRINTER HAVING A CHECK READING MECHANISM WITH SELECTIVE ENGAGEMENT

[75] Inventor: Jeffrey Koeple, Ithaca, N.Y.

[73] Assignee: Axiohm Transaction Solutions, Inc., Bluebell, Pa.

[ * ] Notice: This patent is subject to a terminal disclaimer.

[21] Appl. No.: 08/944,166

[22] Filed: Oct. 6, 1997

[51] Int. Cl.[7] .................. G06F 17/60

[52] U.S. Cl. .................. 235/379; 235/449; 400/356

[58] Field of Search .................. 235/379, 449, 235/475, 493, 435, 436, 439, 480, 486; 271/272, 273, 274; 400/73, 320, 356; 708/106

[56] References Cited

U.S. PATENT DOCUMENTS

| | | | |
|---|---|---|---|
| 4,786,789 | 11/1988 | Gaucher | 235/379 X |
| 5,053,607 | 10/1991 | Carlson et al. | 235/379 |
| 5,634,729 | 6/1997 | Kinney et al. | 400/73 |
| 5,789,727 | 8/1998 | Teradaira et al. | 235/449 |

*Primary Examiner*—Michael G Lee
*Assistant Examiner*—Jared J. Fureman
*Attorney, Agent, or Firm*—Salzman & Levy

[57] ABSTRACT

A printer and method for negotiating transactions at the point of sale in retail establishments. The POS printer includes a check feeding mechanism that feeds a check into receipt printer with a face-up orientation. The mechanism includes a magnet to magnetize magnetic characters on a check and a read head to read and analyze the signal waveform from each character. The check is pressed up against the read head and the MICR is read only after the printing carriage of the receipt printer has moved to a position outside the print zone, within the printer housing. In this position, a tab, riding on the printing carriage, releases a spring-biased pivot plug. The pivot plug becomes free to pivot, thus releasing a spring-biased plunger, the face of which, in turn, forces the check and its indicia against the read head.

2 Claims, 5 Drawing Sheets

RECEIPT PRINTER HAVING A CHECK READING MECHANISM WITH SELECTIVE ENGAGEMENT

FIELD OF THE INVENTION

This invention relates to a new point of sale printer and check processing method and, more particularly, to a new point of sale printer and new method for reading and verifying magnetic ink characters on a check.

BACKGROUND OF THE INVENTION

In retail establishments, it is often found that the retailer wishes to read and verify the account number on a personal check presented in payment at the point of sale. This is necessary in order to determine whether the check account is covered by sufficient funds. Verification requires that the receipt printer have the capability to read the magnetic indicia on the face of the check. This capability is present on some receipt printers, but often the check is forced to be in constant contact with the read head. This constant pressure causes undue wear, skewing, and other complications. Therefore, it would be desirable to have a means to selectively engage the check with the read head after the receipt printing cycle.

The present invention features a selective release mechanism that can be built into a current receipt printer, in order to allow for reading the MICR on a check, after the print cycle. The check is introduced into the printer with a face-up orientation. After the print cycle, the printing carriage moves to a special position outside of the print zone, which allows the MICR mechanism to engage the check for a MICR read.

The receipt printer that has been so converted is Model No. 7221, manufactured by the Axiohm Corportion, Ithaca, N.Y. The conversion mechanism provides for reading a check at the point of sale, and achieves this capability with a minimum change in the receipt printer mechanism.

The MICR reading components are located upon a mounting plate of the receipt printing carriage. The mounting plate is used for carriage drive components. The MICR mechanism is incorporated into the typical functions of the carriage of the printer.

The present invention seeks to provide a new method and apparatus for processing checks at the point of sale.

The invention allows for the selective reading and verifying of magnetic ink characters carried on a personal check at the point-of-sale. In order to selectively read the MICR, the conversion mechanism comprises a magnet to magnetize the characters and a read head to read and analyze the signal waveform from each character. The mechanism reads the MICR characters on a check introduced into the printer. The check is introduced face-up. The machine transports the check past a magnet and a magnetic read head. The printing carriage of the receipt printer moves outside of its typical print zone. In this position, the conversion mechanism becomes active, and allows the check indicia to be pressed against the read head in order that the MICR can be read and recognized.

SUMMARY OF THE INVENTION

In accordance with the present invention, there is provided a point of sale (POS) receipt printer that includes a selective release mechanism that converts the printer into a check account verifying machine. The conversion mechanism magnetizes and selectively reads the account and bank information from existing magnetic characters on a check presented face-up to the receipt printer. The mechanism comprises a magnet to magnetize the characters and a read head to read and analyze the signal waveform from each character. The check is pressed up against the read head and the MICR is read only after the printing carriage of the receipt printer has moved to a position outside the print zone, within the printer housing. In this position, a tab, riding on the printing carriage, releases a spring-biased pivot plug. The pivot plug becomes free to pivot, thus releasing a spring-biased plunger, the face of which, in turn, forces the check and its indicia against the read head.

It is an object of this invention to provide an improved point of sale printer and method.

It is another object of the invention to provide a point of sale printer and method for selectively reading and verifying MICR characters upon a check.

It is a further object of this invention to provide an improved receipt printer that allows the MICR on a customer's personal check to be selectively read after the printing of a receipt at the point of sale.

BRIEF DESCRIPTION OF THE DRAWINGS

A complete understanding of the present invention may be obtained by reference to the accompanying drawings, when considered in conjunction with the subsequent detailed description, in which.

DESCRIPTION OF THE PREFERRED EMBODIMENT

Generally speaking, the invention features a new printer and method for negotiating transactions at the Point-of-Sale in retail establishments. The POS printer includes a conversion mechanism that converts the receipt printer into a check reader only after the print cycle has terminated. The conversion mechanism magnetizes and reads the MICR on a customer's personal check, after the print carriage has move to a "dead zone". For purposes of clarity and brevity, like elements and components will bear the same number throughout the figures.

Figure 1:
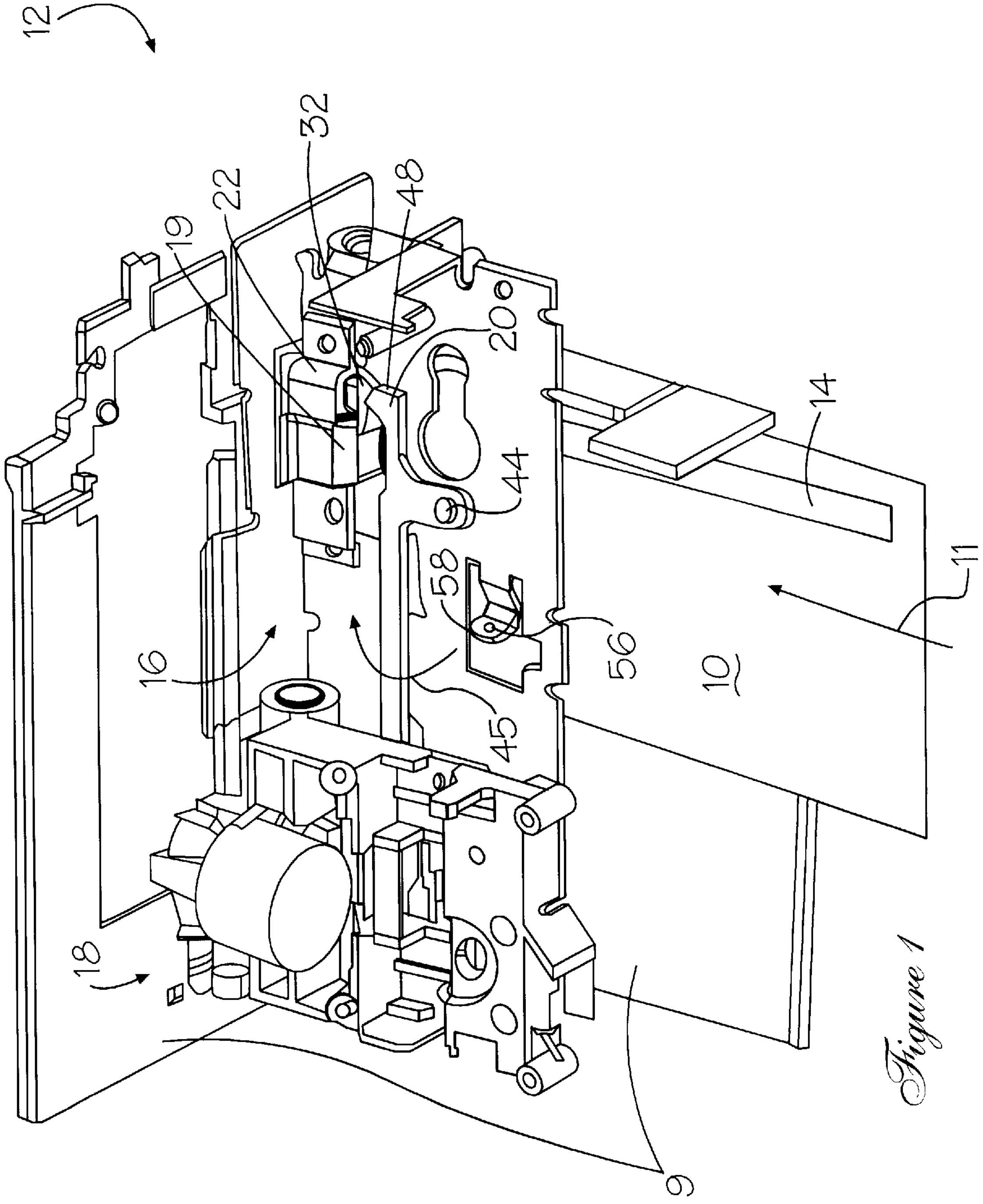
FIG. 1 illustrates a perspective top view of a modified receipt printer containing the conversion mechanism of this invention, receiving a face-up oriented personal check used at a point of sale transaction.

Now referring to FIG. 1, a typical customer's personal check 10 is shown being fed with a face-up, landscape orientation (arrow 11) into a receipt printer 12, from a slip table 9. The feeding mechanism can comprise a pair of nip rollers powered by a drive motor (not shown). The nip rollers convey the check into the printer 12, where the check is read and analyzed. The check 10 is then discharged by reversing the direction of the motor and rollers.

The exact location of the various fields of check 10 is defined in the ANSI and ISO specifications. The ROUTING and ON-US fields, shown as rectangular block 14, convey the bank and account information of the customer's check. These fields are already printed with MICR-readable characters when a customer begins a transaction. Currently, the AMOUNT field is printed by the retailer or the customer's bank after the purchase transaction has occurred.

The conversion mechanism 16 of this invention selectively reads the MICR of the check 10. This conversion mechanism is generally shown by arrow 16. The mechanism 16 is mounted onto the receipt printer 12 adjacent the print carriage 18. The conversion mechanism 16 comprises in part a MICR read head 19, a pivot arm 20, a plunger rod 32, and a mounting bracket 22, as shown. The conversion mechanism 16 allows for the customer's check 10 to have the bank and account indicia in block 14 selectively read and verified by the read head 19, after the receipt printing cycle has terminated. The printer 12 must follow a certain sequence of actions for the selective reading of check 10, as is explained hereinafter, with additional reference to FIGS. 2, 2*a* and 3, 3*a*, respectively.

Figure 2:
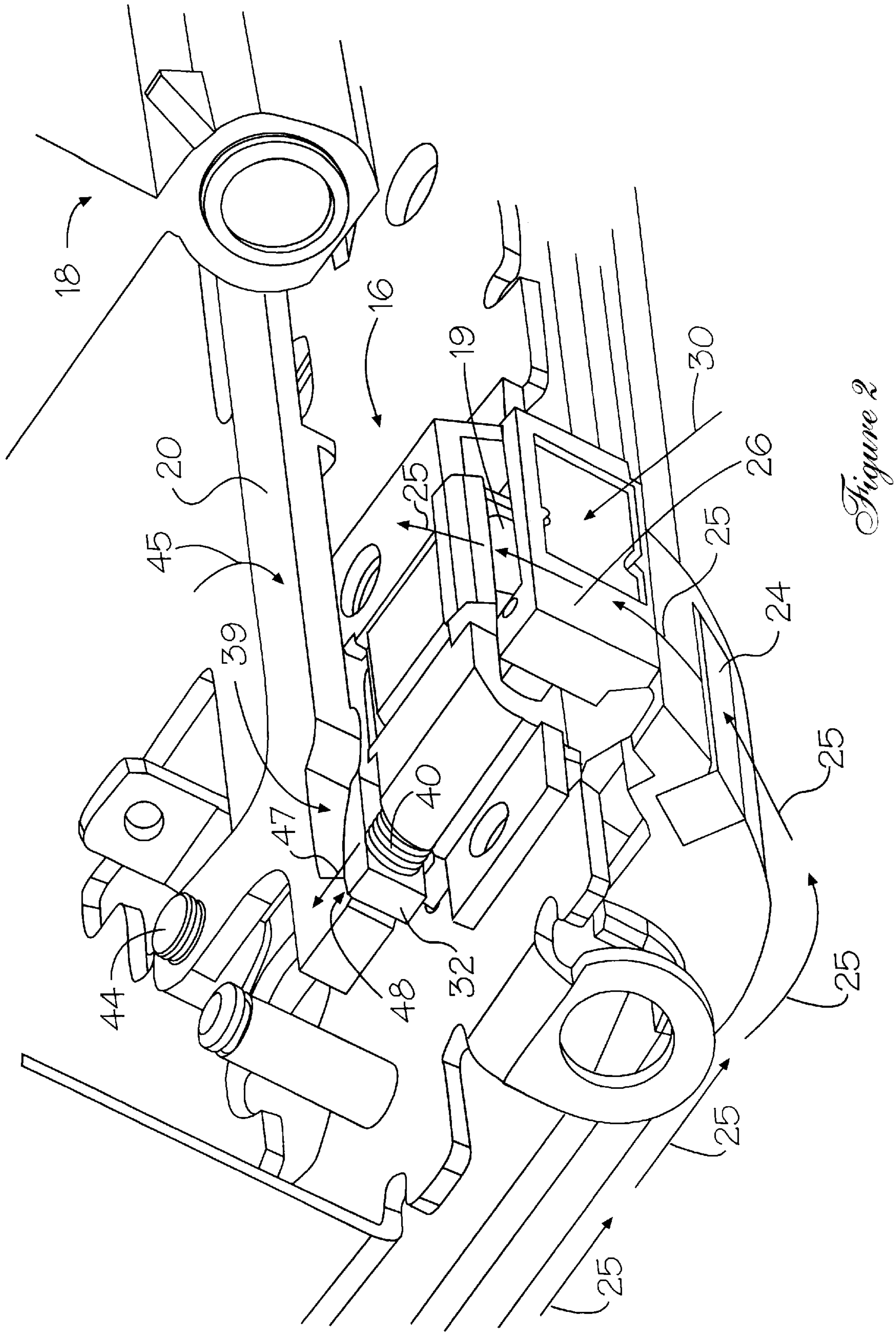
FIG. 2 depicts a rear perspective view of the modified receipt printer shown in FIG. 1, with the check path displayed by sequential arrows that flow past a magnet and read head station.
Figure 2A:
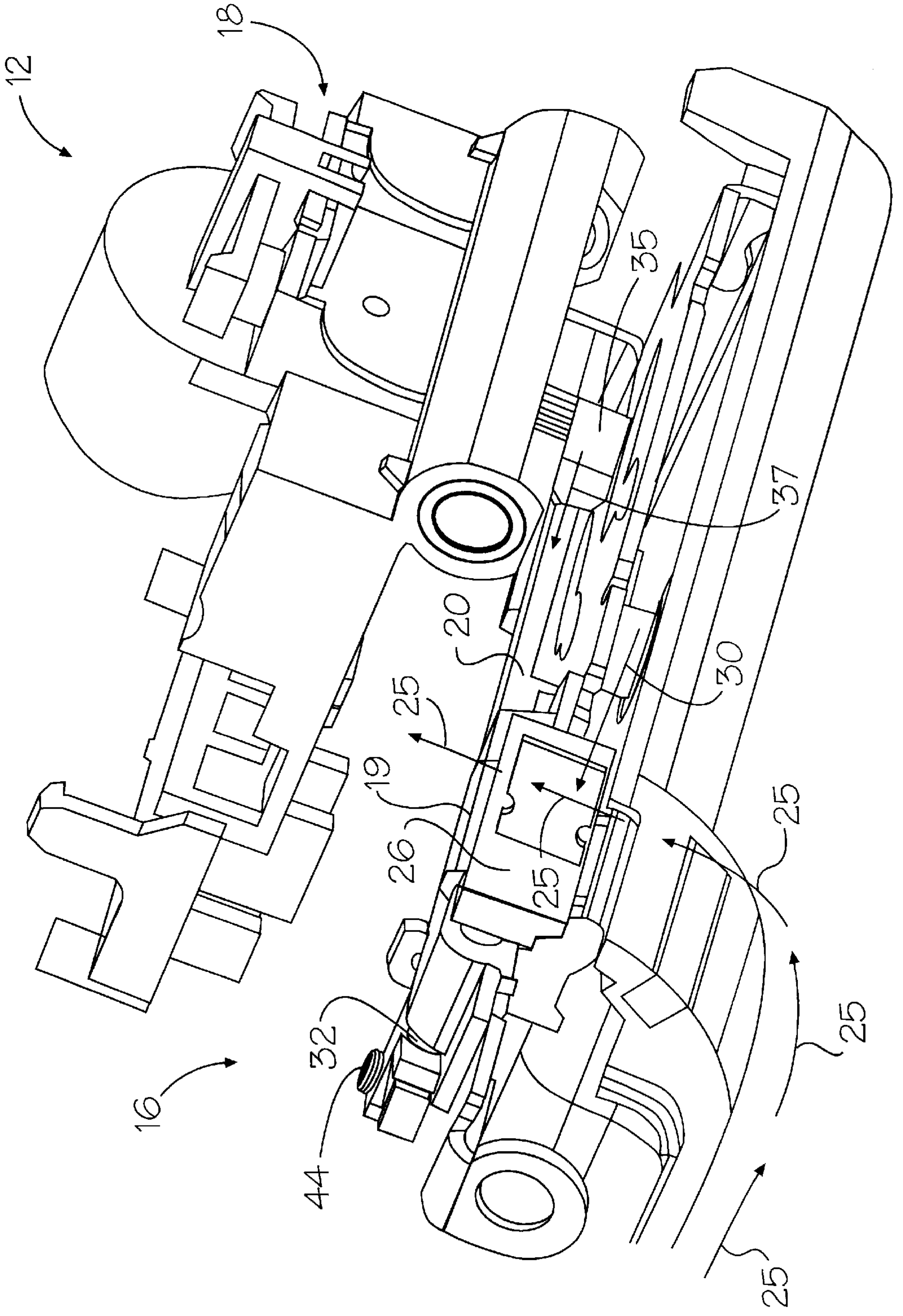
FIG. 2*a* depicts a rear and side perspective view of the modified receipt printer shown in FIG. 2, at a slightly different angle of perspective, wherein a carriage tab carried by the print carriage is shown in adjacent contact with a release pivot arm.

Referring to FIGS. 2 and 2*a*, an arrow path 25 details the route of an incoming check 10. The check 10 is fed face-up through the printer 12, after the receipt has been printed. The check 10 passes the magnet 24. Next, the check passes between the read head 19 and a plunger face 26. The MICR characters within the ROUTING and ON-US fields 14 of check 10 will be read by the read head 19 disposed adjacent magnet 24, only when the plunger face 26 comes into contact with the read head 19 (arrow 30). This occurs only after the receipt printing cycle has terminated. The print cycle ends when the print carriage 18 moves into a dead zone.

A tab 35 (FIG. 2*a*), carried upon the underside of the printing carriage 18, normally rides against the spring-biased pivot arm 20, thus preventing the pivot arm 20 from pivoting about the pivot shaft 44 in the clockwise direction, as shown by arrow 45. The pivot arm 20 is spring-biased by compression spring 40 that biases both the plunger rod 32 and the pivot arm 20.

At the end of the print cycle, the tab 35 moves to the left (arrow 37) along the pivot arm 20. As it reaches the dead zone recess 39 in the pivot arm 20, it drops into the dead zone recess 39 (FIG. 2). Deposit of the tab 35 into the dead zone causes the spring-biased pivot arm 20 to pivot clockwise (arrow 45) about pivot shaft 44. The plunger rod 32 is then forced backward (arrow 47) towards the hammer end 48 of pivot arm 20 under the influence of the coiled compression spring 40, which forces the plunger rod 32 against the receding hammer end 48 of the pivot arm 20. This in turn causes the plunger face 26 against the read head 19, as shown by arrow 30 in FIG. 2*a*. The plunger face 26, disposed opposite the read head 19, is contacted against the check 10 by the spring-biased plunger rod 32. As aforementioned, the plunger rod 32 is biased by the compression coil spring 40. The check 10, passing between the read head 19 and the plunger face 26, now comes into contact with the read head 19, where the MICR indicia which have been magnetized by magnet 24 are now read and analyzed.

Figure 3:
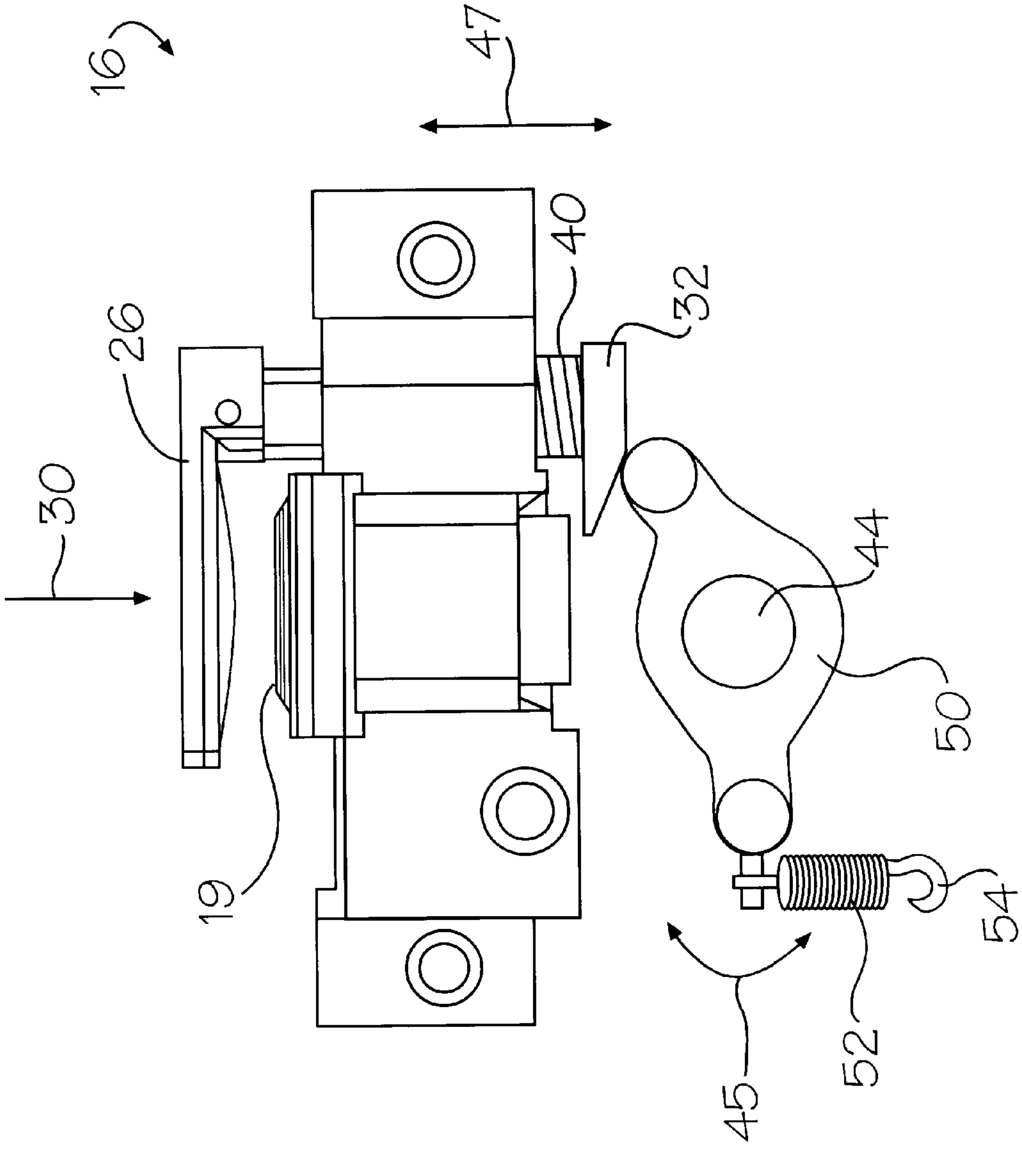
FIG. 3 shows a plan view of an alternate embodiment of the conversion mechanism of this invention.
Figure 3A:
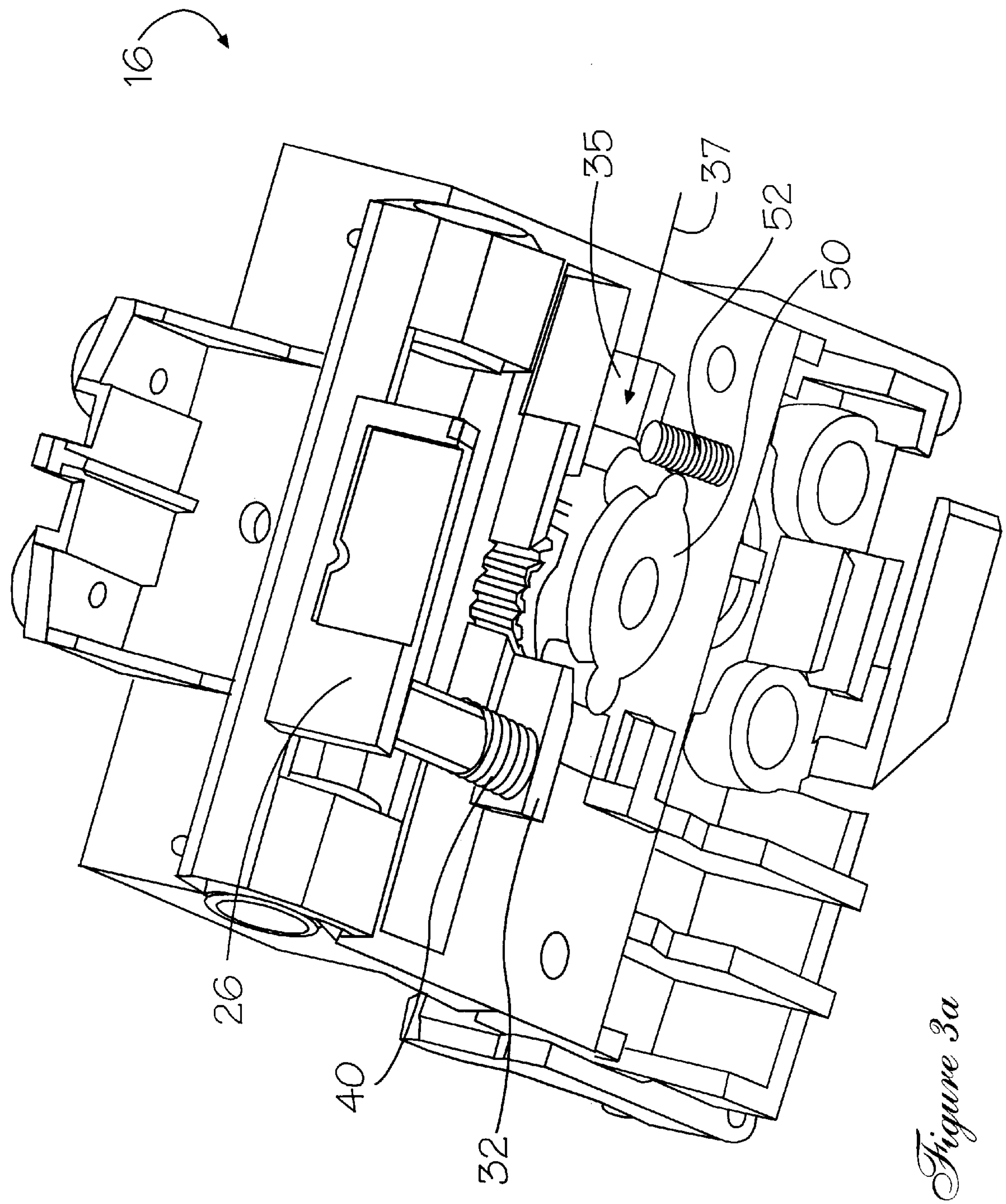
FIG. 3*a* illustrates a perspective view of the alternate embodiment shown in FIG. 3.

Referring to FIGS. 3 and 3*a*, a second embodiment of the conversion mechanism 16 is illustrated. The second embodiment features a pivot plug 50 and extension spring 52, which replaces the pivot arm 20 shown in FIGS. 2 and 2*a*. All of the elements and components of this embodiment are essentially the same as those shown for FIGS. 2 and 2*a*, with the exception of the pivot plug 50 and the extension spring 52. The conversion mechanism 16 of the second embodiment operates in like manner to that of the mechanism shown in the prior figures. The carriage tab 35, shown in FIG. 3*a*, now moves into contact (arrow 37) with the pivot plug 50, when it enters the dead zone. In so contacting the pivot plug 50, the carriage tab 35 causes pivot plug 50 to pivot about shaft 44 (arrow 45). This releases the plunger rod 32 and causes the plunger face 26 to come into contact with the read head 19 and check 10, respectively. The pivot plug 50 is held against pivoting (arrow 45) prior to contact with the carriage tab 35, by the extension spring 52. The extension spring 52 has an end hook 54 that anchors into the hole 56 of flange 58, shown in FIG. 1.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A receipt printer having a face-up check reading mechanism, comprising:

a receipt printing carriage carried upon said receipt printer for movement between a read zone and a non-read zone;

a face-up check reading mechanism disposed adjacent said receipt printing carriage, said check reading mechanism comprising means for feeding said check face-up upon a slip table for reading account and bank information from existing magnetic characters disposed upon said check, said check being fed past a reading station that is actuated by movement of said receipt printing carriage to an inoperative position;

pivot means disposed adjacent said receipt printing carriage and engageable with said receipt printing carriage when said receipt printing carriage moves to said inoperative position, said pivot means comprising a pivot plug, and being pivotable between a check and read head non-engaging position, and a check and read head engaging position, upon engagement with said receipt printing carriage; and check engaging means disposed adjacent said pivot means and engageable therewith, said check engaging means forcing contact between a check and said read head when said pivot means pivots from said check and read head non-engaging position to said check and read head engaging position, said check engaging means comprising a spring-biased plunger rod having a plunger face, said plunger rod being in movable engagement with said pivot plug and being movable between a check and read head non-engaging position and a check and read head engaging position, in response to engagement of said pivot plug with said receipt printing carriage, whereby said plunger face is forced into contact with said check and said read head in order to force engagement of said check with said read head.

2. The receipt printer having a face-up check reading mechanism in accordance with claim 1, wherein said receipt print carriage comprises a tab, and wherein said pivot means comprises a spring-biased pivot plug having a cam contacting said inoperative position of said receipt printing carriage, and in which said tab is disposed when said receipt print carriage moves into said inoperative position.

* * * * *

UNITED STATES PATENT AND TRADEMARK OFFICE

CERTIFICATE OF CORRECTION

PATENT NO. : 6,089,450

DATED : July 18, 2000

INVENTOR(S) : Jeffrey Koepele

It is certified that error appears in the above-identified patent and that said Letters Patent is hereby corrected as shown below:

Title page,

Please correct the spelling of Jeffrey Koeple - correct spelling is Jeffrey Koepele

Signed and Sealed this

Twenty-second Day of May, 2001

*Attest:*

NICHOLAS P. GODICI

*Attesting Officer*

*Acting Director of the United States Patent and Trademark Office*